United States Patent [19]

Ortiz, Jr. et al.

[11] Patent Number: 5,026,979
[45] Date of Patent: Jun. 25, 1991

[54] METHOD AND APPARATUS FOR OPTICALLY MONITORING LASER MATERIALS PROCESSING

[75] Inventors: Angel L. Ortiz, Jr., Scotia; John L. Schneiter, Latham, both of N.Y.

[73] Assignee: General Electric Company, Schenectady, N.Y.

[21] Appl. No.: 489,306

[22] Filed: Mar. 5, 1990

[51] Int. Cl.⁵ .............................................. G01J 1/32
[52] U.S. Cl. ............................. 250/205; 250/227.11; 219/121.83
[58] Field of Search .......................... 250/227.11, 205; 219/121.61, 121.62, 121.81, 121.83

[56] References Cited

U.S. PATENT DOCUMENTS

| | | | |
|---|---|---|---|
| 3,700,850 | 10/1972 | Lumley et al. | 219/121 LM |
| 3,806,829 | 4/1974 | Duston et al. | 331/94.5 |
| 4,164,640 | 8/1979 | Scheffels | 219/121.62 |
| 4,311,142 | 1/1982 | Machida | 128/303.1 |
| 4,338,508 | 7/1982 | Jones et al. | 219/121.81 |
| 4,423,726 | 1/1984 | Imagawa et al. | 128/303.1 |
| 4,504,727 | 3/1985 | Melcher et al. | 219/121 LB |
| 4,565,736 | 1/1986 | Jones et al. | 219/121 L |
| 4,672,215 | 6/1987 | Howard | 250/566 |
| 4,676,586 | 6/1987 | Jones et al. | 350/96.20 |
| 4,681,396 | 7/1987 | Jones | 350/96.18 |
| 4,739,162 | 4/1988 | Ortiz, Jr. et al. | 250/227 |
| 4,764,655 | 8/1988 | Ortiz, Jr. et al. | 219/121.83 |
| 4,766,285 | 8/1988 | Decailloz et al. | 219/121.63 |
| 4,772,772 | 9/1988 | Juptner et al. | 219/121.83 |
| 4,799,755 | 1/1989 | Jones | 350/96.18 |
| 4,838,631 | 6/1989 | Chande et al. | 350/6.6 |
| 4,960,970 | 10/1990 | Schneiter | 219/121.6 |

FOREIGN PATENT DOCUMENTS 62-142091 6/1987 Japan .
63-207487 8/1988 Japan .

Primary Examiner—David C. Nelms
Assistant Examiner—Que T. Le
Attorney, Agent, or Firm—Paul R. Webb, II; James C. Davis, Jr.

[57] ABSTRACT

A laser materials processing apparatus including means for optically monitoring the processing and generating a processing signal representative of the processing, means for interpreting the processing signal and generating an interpreted output, and means for controlling the materials processing based upon the interpreted output and by generating a control signal applied to a laser materials processing component.

16 Claims, 9 Drawing Sheets

METHOD AND APPARATUS FUR OPTICALLY MONITORING LASER MATERIALS PROCESSING

The present invention relates to laser materials processing, and more specifically, to a method and apparatus, utilizing optical sensors, for detecting, monitoring, and controlling, in substantially real-time, laser materials processing operations.

RELATED APPLICATIONS

The present application is related to commonly assigned U.S. Pat. No. 4,960,970 entitled "Method and Apparatus for Acoustic Breakthrough Detection", issued Oct. 2, 1990 and commonly assigned U.S. patent application Ser. No. 07/487,092, entitled "Method and Apparatus For Optically/Acoustically Monitoring Laser Materials Processing", filed Mar. 2, 1990.

BACKGROUND OF THE INVENTION

Laser materials processing as known in the art and used herein refers to performance of materials processes, such as cutting, welding, drilling and soldering, using a continuous wave or pulsed laser beam. The average power of such a laser beam may range from as little as approximately one watt to 100's of watts, the specific power being selected on the basis of the particular process being performed. Laser beam power required for materials processing generally is much greater than laser beam power required for other laser-based systems such as communication systems.

At an early stage of laser technology advancements, a laser beam emitted directly from a laser source was utilized for laser materials processing. The mobility of such laser systems was limited and it was difficult to effectively incorporate such systems into a manufacturing environment. The laser source and optical components had to be located close to process points on a workpiece.

Transmission of laser beams through optical fibers, at power levels suitable for performing materials processing, greatly enhanced the flexibility of laser-based materials processing systems. The transmission of high power beams through an optical fiber, however, presented difficulties not encountered in low power beam optical fiber transmission. For example, beam injection techniques utilized for injecting low power beams, such as beams used in communication systems, into an optical fiber generally are not suitable for high power beam injection. In fact, utilizing a low power beam injection technique for injecting a high power beam may result in damaging the optical fiber. Various techniques for the efficient injection of a high power laser beam into an optical fiber for transmission therethrough are disclosed, for example, in commonly assigned U.S. Pat. Nos. 4,564,736; 4,676,586; and 4,681,396 respectively entitled "Industrial Hand Held Laser Tool and Laser System", "Apparatus and Method for Performing Laser Material Processing Through a Fiber Optic", and "High Power Laser Energy Delivery System".

High power beam transmission through optical fibers has obviated a need for positioning, close to a workpiece, a laser source and optical components otherwise required for directing a laser beam emitted from the source to process points on the workpiece. With optical fiber high power laser beam transmission, an output end of each optical fiber is disposed in an output coupling device which includes means to collimate and focus the beam emitted from the fiber output end. The output coupling device is easily moved relative to a workpiece by, for example, a computer-controlled robotic arm. The number of fibers and their respective output ends proximate process points on a workpiece may vary.

Monitoring materials processing when utilizing optical fiber based systems is much more difficult than monitoring processing when a beam emitted from the laser source is directly utilized for processing. Specifically, with optical fiber transmission, a system user must monitor, during the processing and in addition to the laser source, a beam injection system, an output coupler, and an optical fiber. Failure of any one component may result in failure of the entire system.

Also available to enhance laser materials processing are systems for time sharing of a materials processing laser beam among a plurality of optical fibers. Such systems are described in commonly assigned U.S. Pat. Nos. 4,739,162 and 4,838,631 entitled "Laser Beam Injecting System" and "Laser Directing System", respectively. Manufacturers of beam time sharing systems include Robolase Systems, Inc. of Costa Mesa, Calif. and Lumonics Corporation of Livonia, Mich. By the use of such beam time sharing systems, a beam generated by one laser source can be shared among multiple optical fibers. The respective output ends of each optical fiber may be positioned proximate respective process points on one or more workpieces.

Laser beam time sharing systems, sometimes referred to as multiplexers, have further increased the flexibility and efficiency of laser materials processing. The control and monitoring of such multiplexer-based systems not only has increased importance but also has increased difficulty. The system user must monitor a laser source, a multiplexer, multiple beam injecting systems, multiple couplers, and multiple optical fibers.

As laser materials processing has progressed from using, directly, a beam emitted from a source to using multiple beams emitted from multiple fibers, more sophisticated control and monitoring of the process have become needed. The control and monitoring systems preferably facilitate obtaining desired processing results and aid in preventing damage to the processing equipment. The control and monitoring systems, however, should not slow down the laser materials processing operations. Otherwise, advantages of utilizing optical fiber/laser technology, such as a reduction in processing time, may be lost.

Further, it is preferred that control and monitoring systems operate in substantially real-time. As used herein, the term "real-time" means the actual time which each discrete process operation is performed. For example, a discrete process operation may be drilling one hole. It is most desirable that a control and monitoring system be able to obtain data simultaneous with and during each discrete operation so that if adjustments to processing equipment are needed, such adjustments can be made before a next hole is drilled, i.e., before a next process operation. It should be understood that the time required to perform a discrete process operation may be short, such as a few microseconds. The control and monitoring system, therefore, must perform its functions very quickly.

An entire process operation, of course, generally includes many discrete process operations. Consider, for example, laser drilling of an aircraft engine combustor and afterburner parts. These parts are made from high temperature steel alloys and require tens of thousands of 0.020 inch (0.0508 cm) holes drilled at 20 degrees to the surface, where wall thickness may vary from 0.020 inch (0.0508 cm) to 0.080 inch (0.2032 cm). In order to timely complete the entire process operation, monitoring and controlling the formation of each hole should be performed quickly.

A known method for monitoring laser drilling operations is referred to as air flow testing. For an airflow test, a workpiece such as an aircraft engine combustor part is removed from the drilling apparatus and a known pressure differential is applied across the workpiece. The resulting air flow is measured to provide a measure of flow resistance. Flow resistance is related to a measure of drilled area, i.e., the diameter and shape of the drilled holes. Air flow testing, however, is not a real-time operation in the sense that laser processing cannot take place on a workpiece during an air flow test. An air flow test limitation is that it also is not an indicator of other hole geometric properties, e.g. recast layer thickness, hole taper, etc.

Another known method for checking the results of a laser drilling operation is "pin checking". In a pin checking operation, drilling is stopped, and then pins of successively increasing diameter are successively inserted into selected holes. Pin checking provides an approximate indication of hole diameter because laser-drilled holes are rarely perfectly straight, thus blocking insertion of the pins. Pin checking also is not a reliable indicator of other hole geometric properties nor is it a real time process. Further, only selected holes are analyzed in the pin checking procedure and differences between each hole may not be detected.

It is therefore an object of the present invention to provide a method and system for detecting and monitoring, in substantially real time, laser materials processing.

Another object of the present invention is to provide a method and system for detecting and monitoring laser materials processing which do not slow down the processing operations.

Still another object of the present invention is to provide a method and system for detecting and monitoring laser materials processing which allow continuous monitoring of the processing operations and provide an indication of geometric properties including recast layer thickness and hole taper.

Still yet another object of the present invention is to provide a method and system for detecting and monitoring laser materials processing which operate simultaneously with the processing operations.

Another object of the present invention is to provide a method and system which utilize optical sensors to monitor plasma generated during a laser materials processing operation, and from data provided by the sensors, control the processing operations.

Still another object of the present invention is to provide a control system which facilitates obtaining consistent laser materials processing performance.

Still yet another object of the present invention is to provide a method and system for monitoring and controlling performance of laser materials processing components.

SUMMARY OF THE INVENTION

The present system for monitoring and controlling laser materials processing includes means for detecting optic signals during the processing operations and means for determining laser beam breakthrough time. A method in accordance with the invention for laser processing a workpiece includes the steps of optically monitoring the workpiece and determining laser beam breakthrough time. By determining breakthrough time in substantially real time, the present invention provides timely information for controlling materials processing operations.

Laser beam breakthrough time, as used herein, refers to the fractional time breakthrough is detected compared with total laser pulse duration. It is recognized that laser pulse length, rather than laser pulse duration, could be utilized to calculate breakthrough time. Laser pulse duration equals the total time period that a beam pulse is applied to a workpiece whereas laser pulse length, as used in the art and as used herein, means the time period between one-half maximum beam intensity values of the beam pulse. Either pulse duration or pulse length may be utilized so long as such usage is consistent.

By optically monitoring, continuously, a laser-based materials processing operation, and from optic signals, the precise time at which a beam breaks through the material can be detected. By comparing the time period required to break through the material with the laser pulse duration, information regarding the hole drilled as result of the operation can be determined.

For example, if breakthrough is detected just at the end of the beam pulse duration, then breakthrough time may be substantially equal to one (1). This means that the laser beam was not applied for very long after breaking through the workpiece. This, in turn, means that a smaller diameter hole was formed. Conversely, if breakthrough is detected at the beginning of the beam pulse duration, then breakthrough time may, for example, be equal to 0.2, i.e., smaller than if breakthrough is detected near the end of the beam duration. This means that the laser beam was applied for a relatively long time, e.g., 0.8, subsequent to breakthrough. This, in turn, means that a larger diameter hole is formed. It should be understood of course that the above examples are for illustrative purposes only.

The present invention provides continuous monitoring and control of laser materials processing and operates in substantially real time. Importantly, the present invention does not affect laser materials processing speed and operates simultaneously with the processing operations. The present invention may be utilized to provide an indication of other hole geometry properties including recast layer thickness and hole taper. Further, the present invention facilitates obtaining consistent and high quality results from laser materials processing.

BRIEF DESCRIPTION OF THE DRAWINGS

These and other objects of the present invention, together with further features and advantages thereof, will be apparent from the following detailed specification when read together with the accompanying drawings, in which.

DETAILED DESCRIPTION OF THE DRAWINGS

Figure 1:
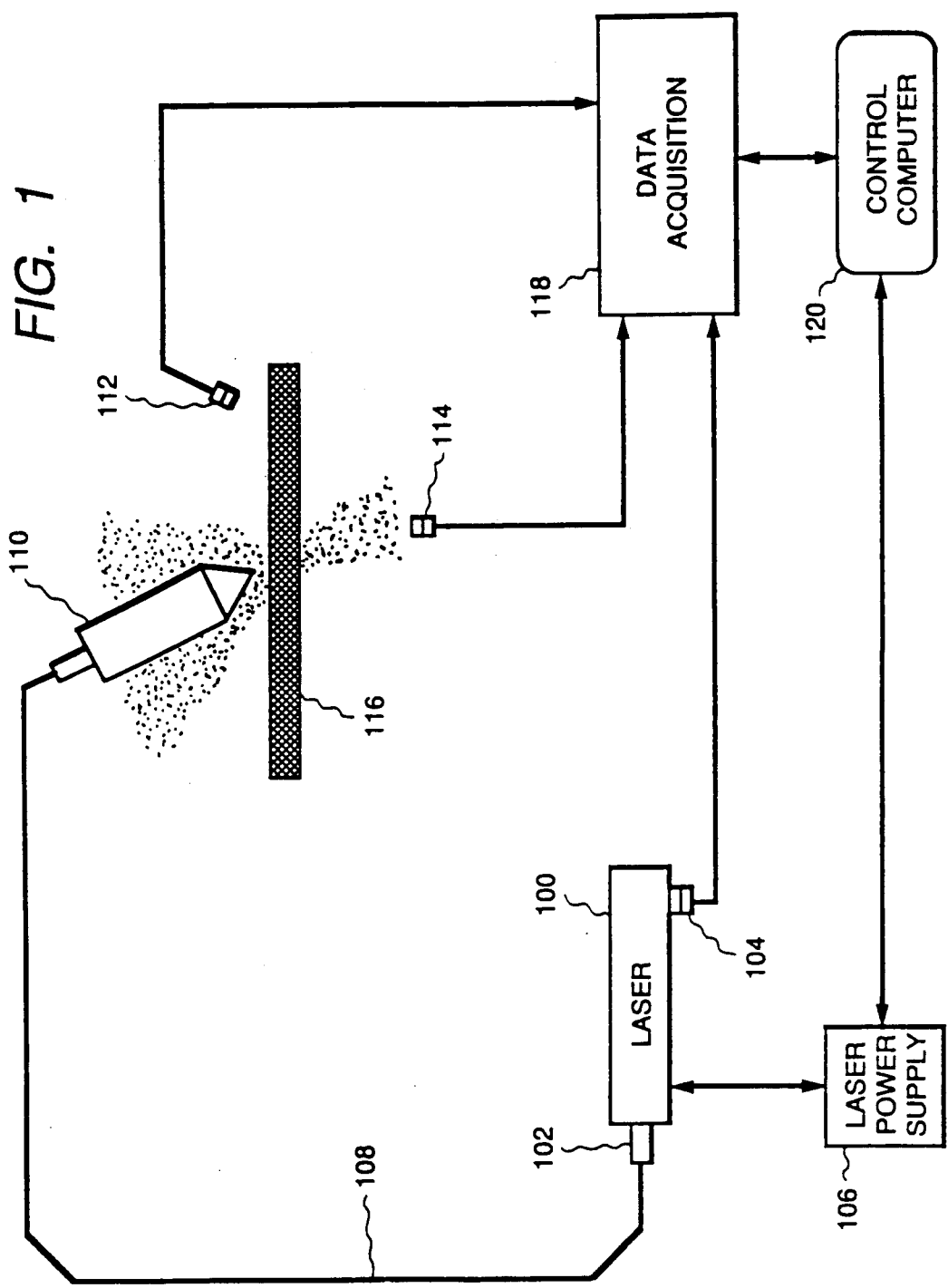
FIG. 1 shows a partly isometric and partly block diagram of a first embodiment of an optic-based monitoring apparatus.

FIG. 1 illustrates a first embodiment of an optic based monitoring apparatus in accordance with the present invention. Specifically, and referring to FIG. 1, an optic based monitoring system includes a laser source 100 including a fiber injection input coupler 102 and a cavity monitor 104 such as a photodiode. A laser power supply 106 is coupled to the laser and provides power for flashlamps (not shown). FIG. 1 shows a laser 100, such as a face pumped laser (FPL) of the Nd:YAG type. While other types of lasers can be used, FPLs are preferred since they have a high energy density, a large depth of field that does not require refocusing between pulses, and a high beam quality. Furthermore, Nd:YAG provides an output at 1.06 micrometers, which is a good wavelength for processing a large number of materials.

The apparatus further includes an optical fiber 108 coupled between laser source 100 and an output coupler 110, such as the coupler shown in U.S. Pat. No. 4,799,755. Preferably, both ends of fiber 108 are prepared such as shown in U.S. Pat. No. 4,676,586 and 4,681,396 so that the fiber is not damaged by the injection or emitted laser light. If desired, a light multiplexer, such as shown in U.S. Pat. No. 4,739,162, can be used to allow simultaneous processing at a plurality of workpiece locations. Coupler 110 is supported by a manipulation system such as model HP-105 machine tool made by S. E. Huffman Corp., Clover, S.C. A top-side optic sensor 112 and a bottom-side optic sensor 114, such as photodiodes, may be mounted to a frame (not shown) and disposed proximate a workpiece 116. For optic sensing, photodiodes, photo-transistors, photo-multipliers, or any means suitable for generating a signal representative of optical characteristics may be utilized. A data acquisition unit 118 receives inputs from the photodetectors. Data acquisition unit 118 is coupled to a control computer 120.

Computer 120 comprises an analog-to-digital converter operating at a frequency of 111 KHz to convert the signal from optical sensor 104. Other frequencies can be used. The converted signal is then applied to a decision algorithm, such as a threshold operation, which allows for the detection or determination of the onset and cessation of the laser pulse. The data resulting from this algorithm represents the optical pulse duration. Within computer 120 the data from the optical sensors are digitized and then operated upon by a digital algorithm which in a particular embodiment determines signal pulse length. In general, the optical signal content will be a function of the workpiece material and thickness, the wavelength of laser light, the hole geometry, and the laser pulse energy and duration.

The optical signal is operated upon by a pulse length determination algorithm. A threshold decision algorithm is applied to the optical signal data resulting from the pulse length determination algorithm to determine breakthrough. It will be appreciated that although the above description is directed to drilling, the invention can be used with other laser materials processes, e.g., surface cladding, heat treating, cutting, etc.

Optical sensors 112 and 114, for example, could be optical sensors commercially available such as model YAG-100A manufactured by EG&G of Salem, Mass. or a Series AFM Fiberoptic Monitor from Antel Optronics Inc. of Burlington, Ontario-Canada. Data acquisition unit 118 preferably is a high speed data acquisition system capable of capturing data at a rate of 3 microseconds per sample. A data acquisition system may, for example, be a system commercially available such as a Burr Brown Model MPV90 A/D Converter coupled in a Motorola Series 68020 computer.

In operation, top-side optical sensor 112 is utilized to optically detect a laser interaction plasma region and the bottom side optical sensor is utilized to detect material breakthrough plasma. More specifically, the optical sensor will generate signals related to the intensity of light generated during a materials processing operation.

Figure 2:
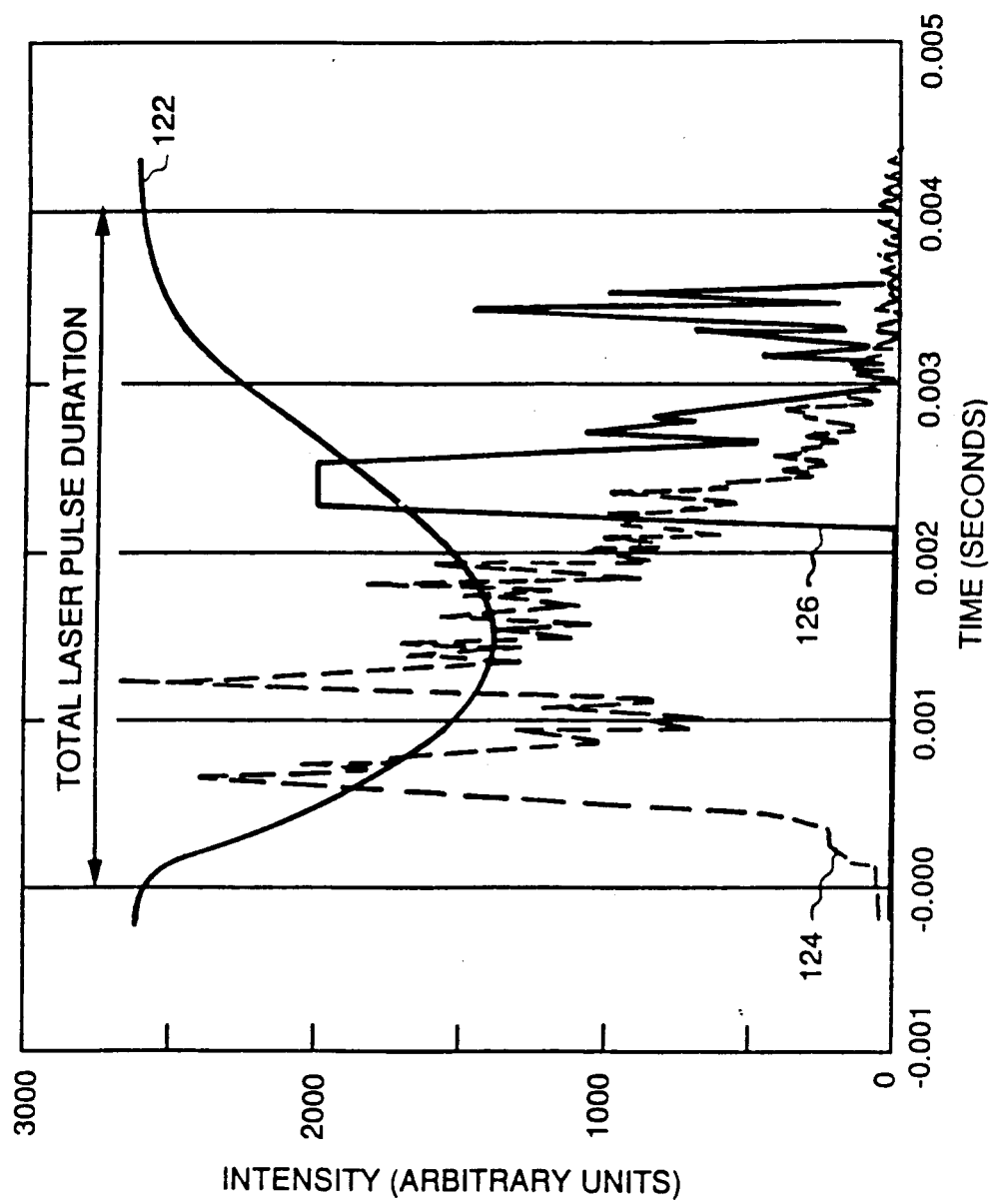
FIG. 2 shows signals generated during drilling and at breakthrough by the apparatus illustrated in FIG. 1.

FIG. 2 illustrates signals generated during a laser drilling operation utilizing the apparatus illustrated in FIG. 1. Specifically, in FIG. 2 the vertical scale represent intensity (arbitrary units) and the horizontal scale represents time. A signal 122 is the signal which was provided by photodiode 104 and represents the total laser pulse duration. A signal 124 is the signal which was generated by optic sensor 112 and provides data regarding the laser interaction plasma behavior. A signal 126 is the signal which was generated by optic sensor 114 and provides data on actual breakthrough onset time. As is apparent form FIG. 2, breakthrough was detected at approximately 0.002 seconds.

Figure 3A:
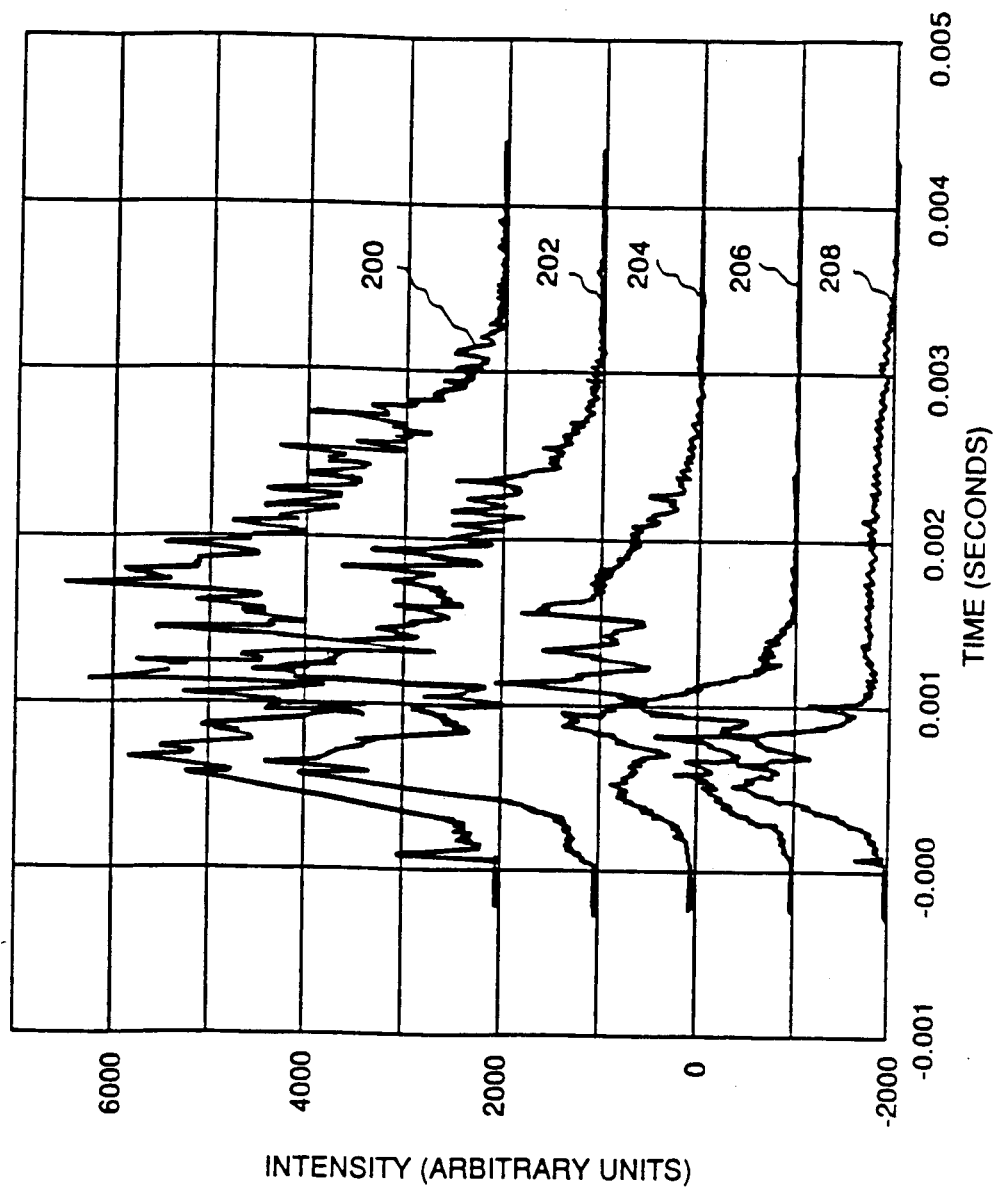
FIGS. 3A-B illustrate signals generated during drilling and at breakthrough for various material thicknesses.

FIG. 3A shows signals generated by the top side sensor for a variety of thickness materials. Specifically, in FIG. 3A, signals 200, 202, 204, 206 and 208 correspond to the signals generated by optical sensor 112 when drilling through materials of 60 mils, 50 mils, 40 mils, 30 mils, and 20 mils, thicknesses, respectively (1 mil=0.001 inches). The data is shown as being vertically displaced for clarity. Signals 210, 212, 214, 216, and 218 in FIG. 3B correspond to signals which were generated by optical sensor 114 when drilling through materials having a thickness of 60 mils, 50 mils, 40 mils, 30 mils, and 20 mils, respectively. Again, the signals are shown as being vertically displaced for clarity.

Figure 3B:
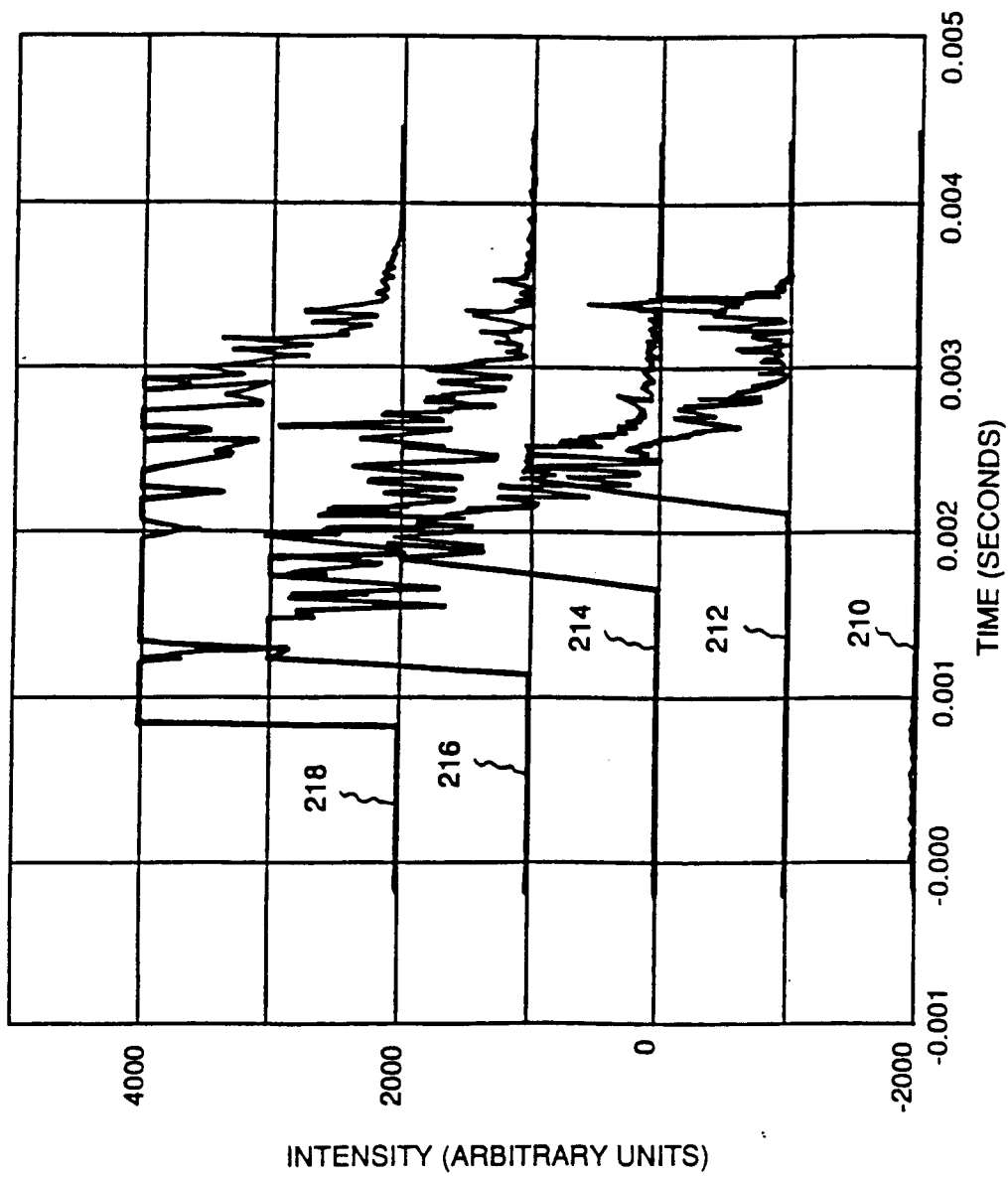

The signals represented in FIGS. 2 and 3A–B were generated during actual processing operations. In FIG. 3A, the data establishes that pulse width of the top side sensor generated signals decreases as breakthrough time decreases. Further, note that signal 200, which corresponds to a 60 mil thickness material wherein no breakthrough occurred. This condition is the no breakthrough baseline. Further, as shown in FIG. 3B, the pulse width of the signal generated by the bottom side sensor increases as breakthrough time decreases. For the 60 mil thick material, no breakthrough was detected as indicated by signal 210. This condition is the no breakthrough baseline.

In some operations, it is contemplated that a bottom side sensor may not be utilized due to work environment constraints. Data from only a top side sensor, therefore, would have to be utilized to monitor and control the operations. More specifically, if only a top side sensor is being utilized, the thickness, e.g., 40 mils, of the workpiece would first be ascertained. A test coupon of the same thickness would then be utilized for gathering calibration data using both top and bottom side sensors. Using the sensors, a breakthrough time for the desired diameter hole can be determined, and also a preferred top side sensor signal can be determined. The preferred top side sensor signal would be the top side sensor signal generated when the preferred hole diameter and breakthrough time were present. The preferred top side sensor signal could then be converted to digital form and stored in computer memory.

During operations, a signal just provided from the top side sensor would be compared with the stored top side sensor signal. Many methods, such as a correlation method, could be utilized when performing the comparison. If deviations beyond some predetermined threshold occur, then adjustment to the processing components may be required.

Further, from the gathered data, breakthrough time can be calculated, as best shown in FIG. 2. Specifically, total pulse duration can be determined as well as the time at which breakthrough occurs. Such data is available from signals generated by photodetector 104 and optical sensor 112 and/or 114. Using this gathered information, and once breakthrough time is determined, control computer 120 may make adjustments to the materials processing operations in order to achieve the desired results.

Figure 4:
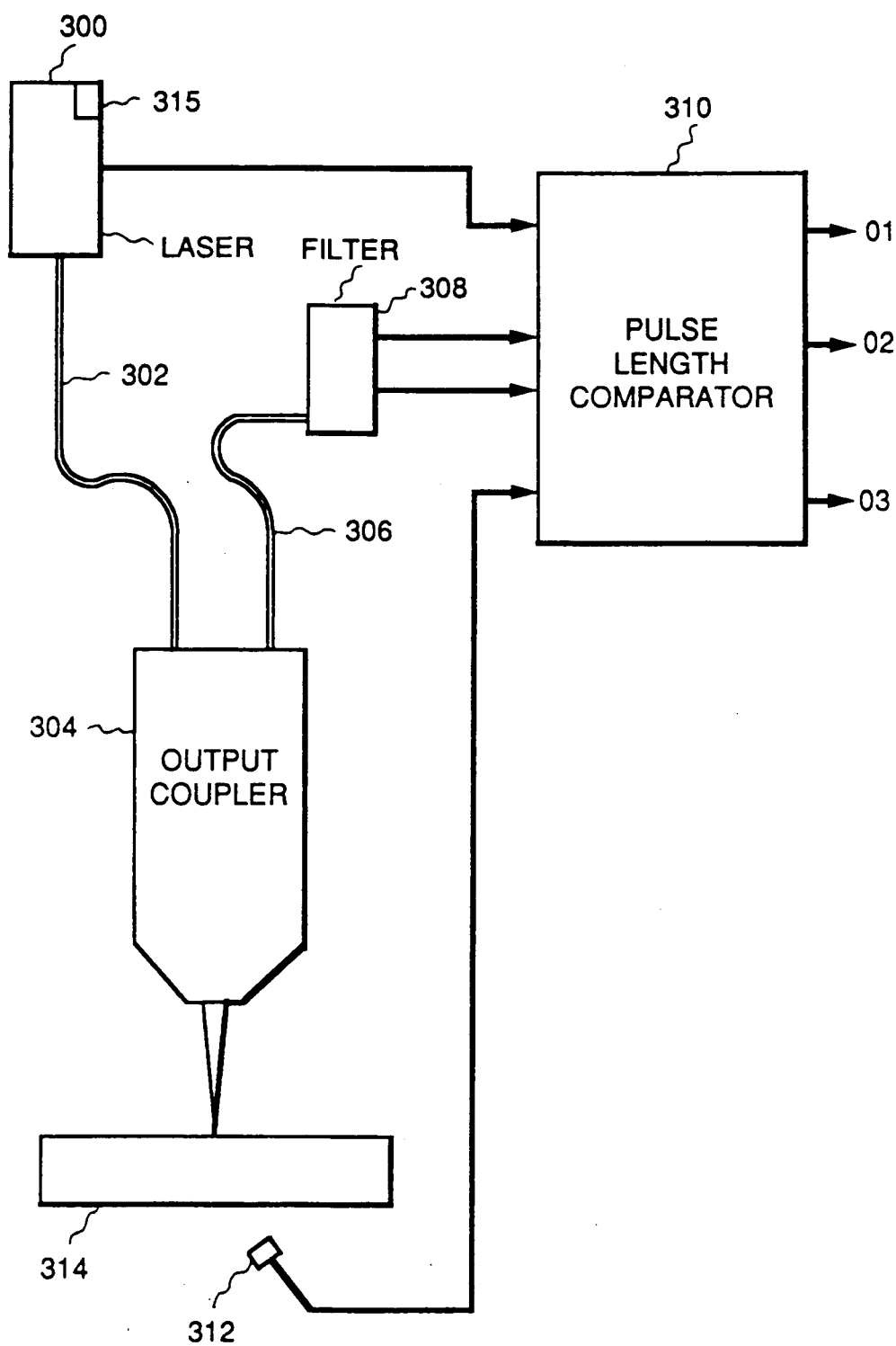
FIG. 4 illustrates a partly isometric and partly block diagram of a second embodiment of an optic-based monitoring apparatus.

FIG. 4 illustrates a second embodiment of an optic based monitoring apparatus. Specifically, FIG. 4 illustrates a laser source 300 and a first optical fiber 302 coupled between laser source 300 and an output coupler 304. A second optical fiber 306 couples output coupler 304 to a filter 308. Laser source 300 and filter 308 are coupled to a pulse length comparator 310. The pulse length comparator can be implemented as all hardware, software, of a combination of hardware-software. Another input to pulse length comparator 310 is received from an optical sensor 312 which is disposed below and substantially adjacent a workpiece 314. A photodetector 315 mounted within or to laser source 300 provides another input to pulse length comparator 310. Pulse length comparator 310 generates a first output 01, a second output 02, and a third output 03, respectively, which may be coupled to a laser control, a workpiece manipulator, and a display, respectively.

Figure 5:
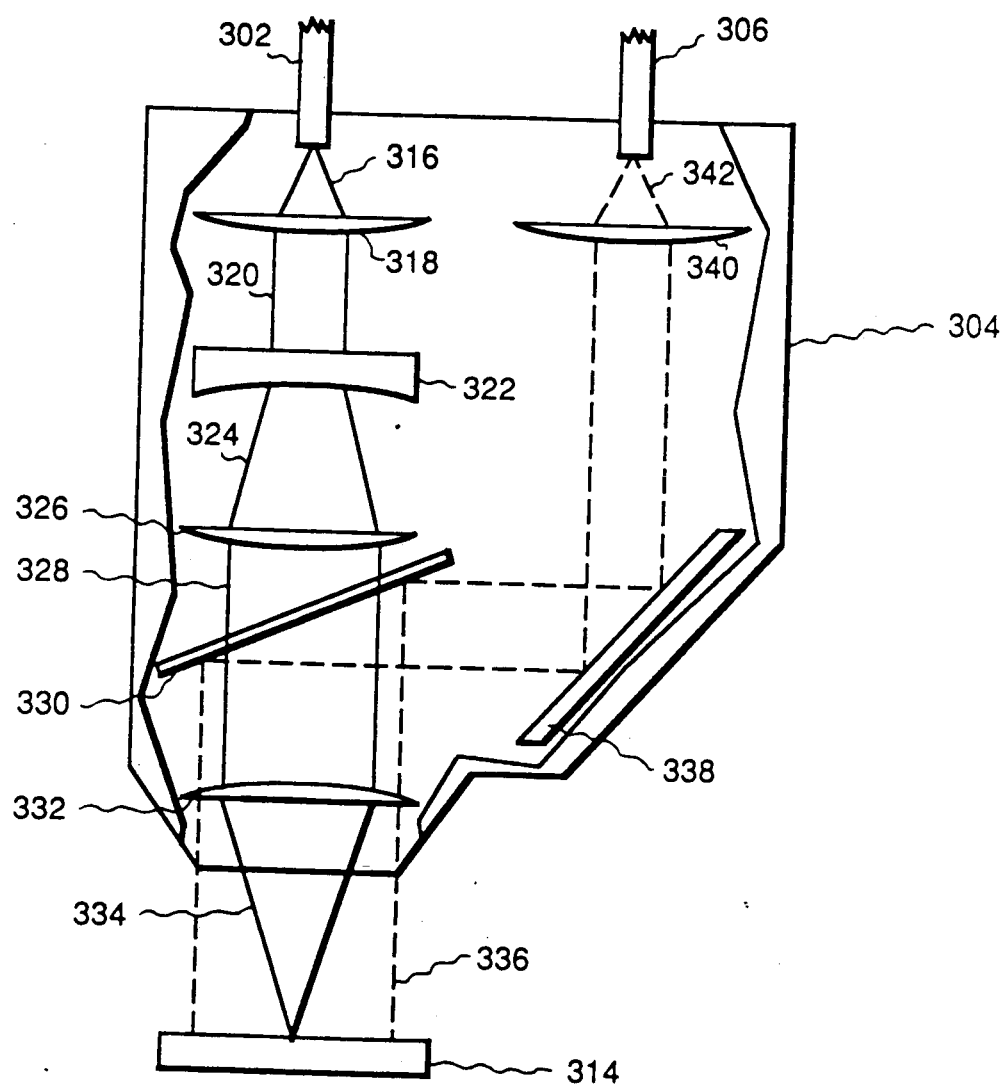
FIG. 5 is a more detailed view of the output coupler illustrated in FIG. 4.

FIG. 5 illustrates a more detailed view of output coupler 304. Specifically, fiber 302, in operation, transmits and emits a first diverging beam 316 from laser source 300. Beam 316 is intercepted by a first collimating lens 318 which emits a first collimated beam 320. Beam 320 is intercepted by a beam expanding lens 322 which emits a second diverging beam 324. Diverging beam 324 is intercepted by a second collimating lens 326. The second collimating lens emits a second collimated beam 328 which passes through, substantially undisturbed, a mirror 330. Mirror 330 is coated so as to totally transmit 1.06 micrometer wavelengths at forty-five degrees. Such coatings are well known in the art. The second collimated beam is then intercepted by a first focusing lens 332 which focuses a beam 334 onto workpiece 314. As the focused beam interacts with workpiece 314, a plasma is generated, and an image 336 of the generated plasma is reflected to mirror 330. The reflected image of the plasma is then directed towards a second mirror 338. Mirror 338 directs the image to a second focusing lens 340 which focuses an optical image signal 342 onto optical fiber 306 for transmission to filter 308. It is contemplated that a bundle of fibers could be utilized rather than single fiber 306. Further, lens 340 could be one of many types of lenses, and may even be eliminated, so long as the optical image signal of the plasma is injected in the fiber.

Figure 6:
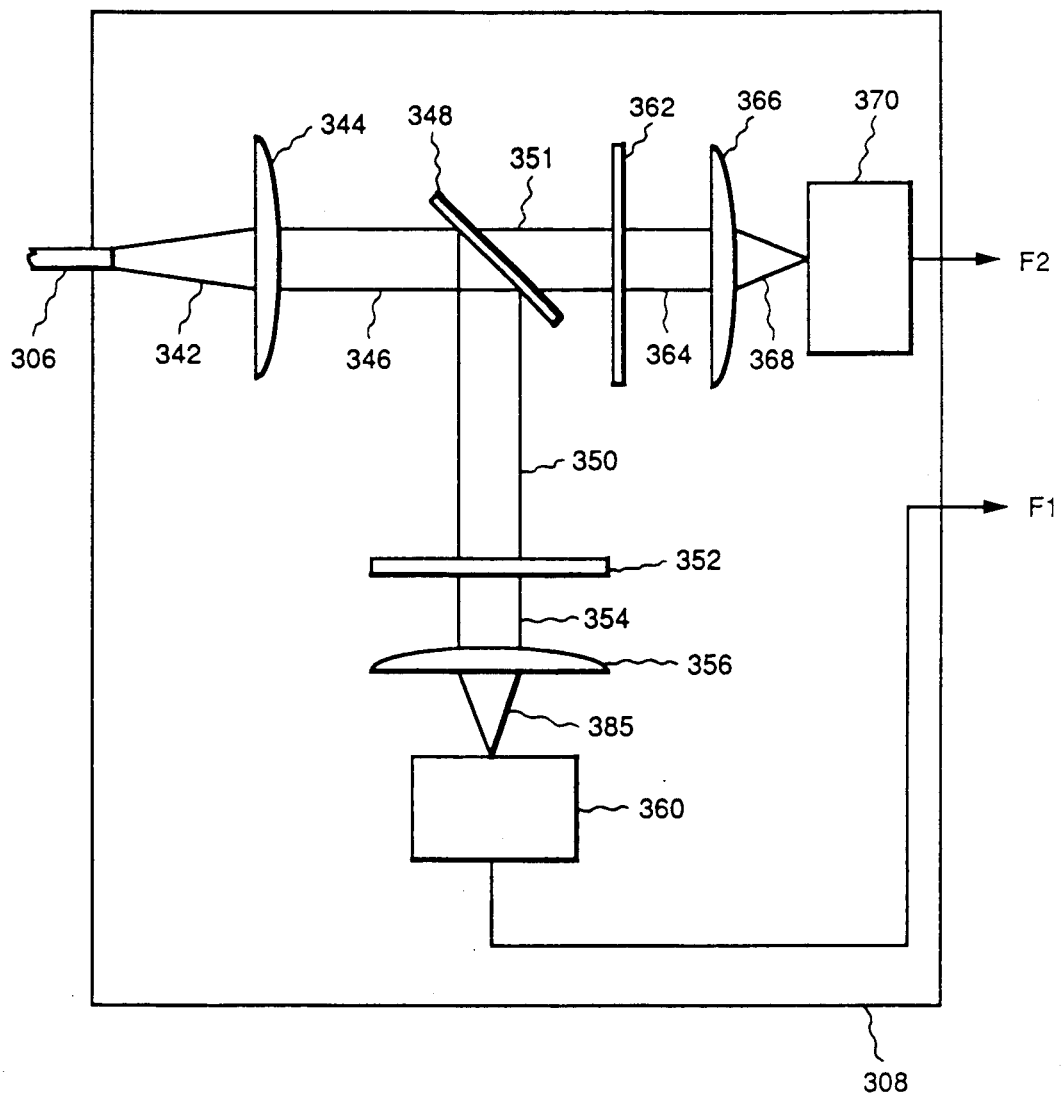
FIG. 6 is a more detailed view of the filter illustrated in FIG. 4.

FIG. 6 illustrates, in more detail, filter 308. Specifically, filter 308 receives, as input, optical image signal 342 emitted at the output end of optical fiber 306 and intercepted by a collimating lens 344. A collimated beam 346 is intercepted by a mirror 348 which splits beam 346 into a first portion 350 and a second portion 351. Mirror 348 preferably is coated so that it reflects only 1.06 micrometer signals when disposed at forty-five degrees. This arrangement is utilized because a portion of the processing beam may be reflected from the workpiece and back towards the output coupler. Therefore, some of the signal transmitted by fiber 306 may actually include some signal of the processing beam rather than only signals representative of the plasma formed by the beam. The signals representative of the plasma generally are wideband signals and therefore would be transmitted, substantially undisturbed, through the mirror as second portion 351. First beam portion 350 is intercepted by a spike filter 352 which transmits only optical signals having a wavelength of 1.06 micrometers. A filtered beam 354 is transmitted to a focusing lens 356 which focuses a filtered beam 358 onto a photodetector 360. The signal provided by photodetector 360 is representative of pulse duration.

Second beam portion 351 is intercepted by a second filter 362 which only transmits signals of a wavelength, for example, less than 1.06 micrometers. Many different filtering apparatus can be utilized so long as the signals of the processing beam, i.e., 1.06 micrometer signals, are not transmitted. A filtered beam 364 is intercepted by a focusing lens 366 which focuses beam 368 onto a second photodetector 370. The signal generated from photodetector 370 is representative of the plasma generated during materials processing. Outputs F1 and F2, respectively, provided from photodetectors 360 and 370, respectively are provided to a pulse length comparator 310 for further processing. Specifically, the signals may be amplified and then converted into digital form.

In operation, and referring again to FIG. 4, a beam output from source 300 is transmitted through optical fiber 302 to output coupler 304. As explained with reference to FIG. 8, the beam is then focused onto workpiece 314. The plasma generated due to the beam impinging upon workpiece 314 creates an image signal which is transferred back through the output coupler and through optical fiber 306 to filter 308. The image signal provides information regarding the intensity of the plasma. The plasma intensity is directly related to process operations such as laser beam intensity. The data provided by the image signal therefore can be utilized to control processing.

When breakthrough occurs, optical sensor 312 also generates a signal which is transmitted to pulse length comparator 310. Photodetector 315 provides a signal representative of the total pulse length duration. From this information, breakthrough time can be determined. If breakthrough time is greater or less than expected, adjustments may be made so that more desirable processing results are achieved. For example, laser beam energy or the relative position of the output coupler to the workpiece may be adjusted.

The operation of the embodiment illustrated in FIG. 4 is similar to the embodiment illustrated in FIG. 1. Optical sensor 112 illustrated in FIG. 4, however, is replaced in the embodiment illustrated in FIG. 4 with a lens system within output coupler 304 itself. In some configurations, a lens system within output coupler 304 may be preferred because it eliminates problems associated with drilling splatter contamination and keeps the sensor free from debris.

Figure 7:
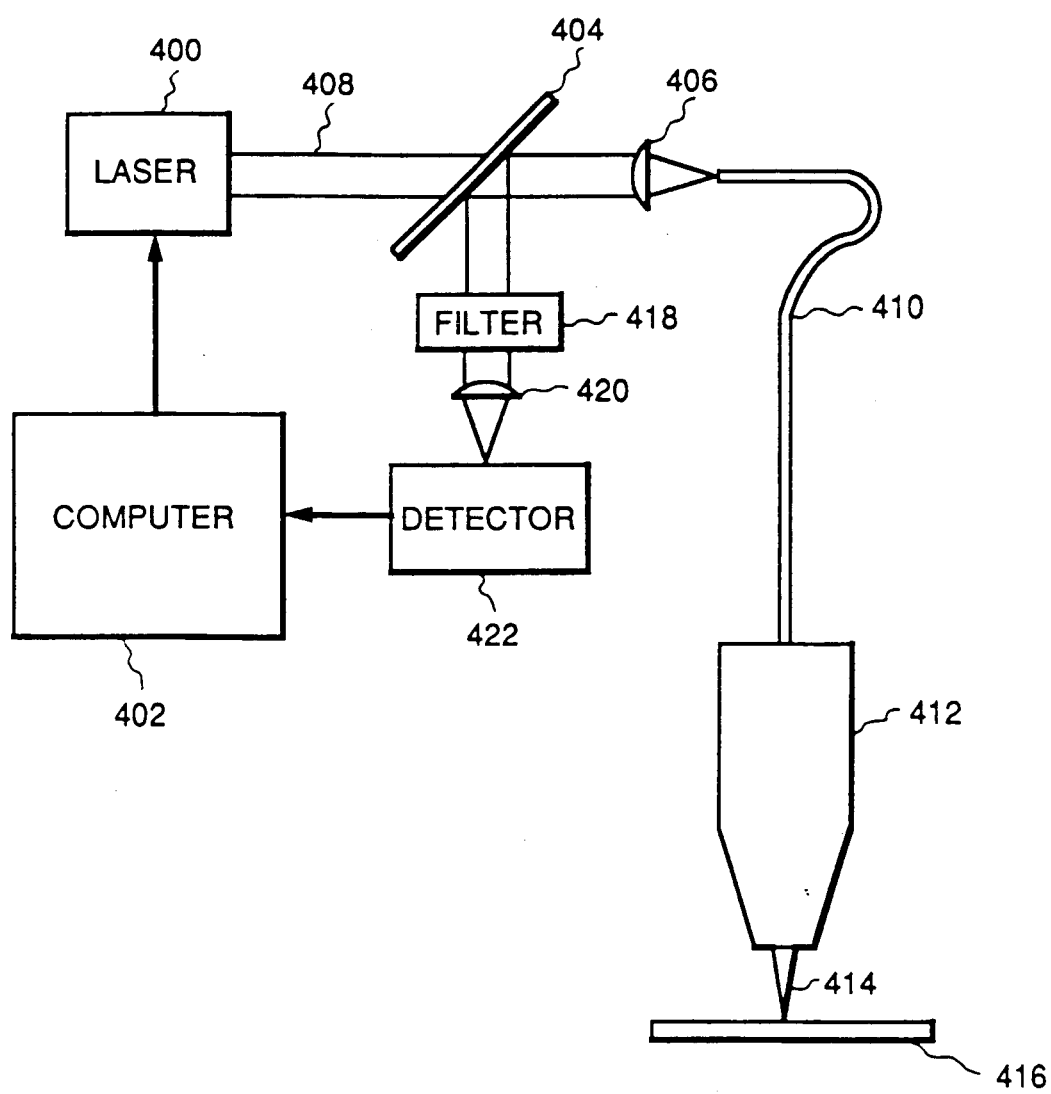
FIG. 7 illustrates a third embodiment of an optic-based monitoring apparatus.

A third embodiment of an optic based monitoring system is illustrated in FIG. 7. This embodiment includes a laser source 400 coupled to a computer 402. A mirror 404 and a focusing lens 406 are utilized for injecting a beam 408 from laser source 400 into an optical fiber 410. Mirror 404 is totally transmissive to 1.06 micrometer signals, and therefore beam 408 is transmitted, substantially undisturbed, through mirror 404. Optical fiber 410 is coupled to an output coupler 412 which emits a processing beam 414 onto a workpiece 416. Mirror 404 also is aligned with a 1.06 micrometer filter 418, a focusing lens 420 and photodetector 422.

Figure 8:
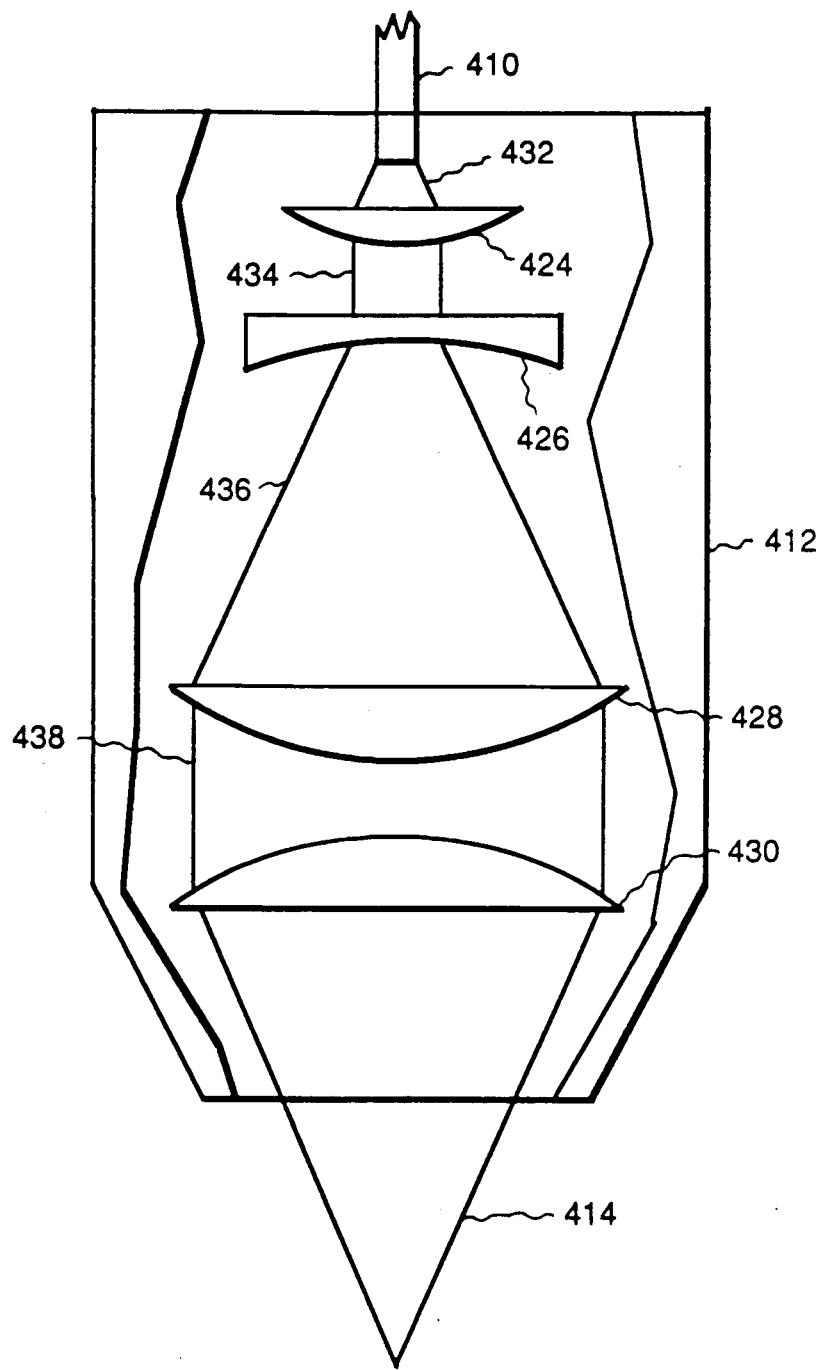
FIG. 8 is a more detailed view of an output coupler shown in FIG. 7.

As shown in FIG. 8, output coupler 412 includes a first collimating lens 424 and a beam expanding lens 426. A second collimating lens 428 is aligned with lens 426 and a focusing lens 430 is aligned with lens 428.

In operation, beam 408 emitted from source 400 is injected into fiber 410 by lens 406. The beam is transmitted by the optical fiber to output coupler 412 and emitted as a first diverging beam 432. Beam 432 is intercepted by lens 424 which forms a first collimated beam 434. The first collimated beam is intercepted by beam expanding lens 426 which forms a second diverging beam 436. Lens 428 intercepts the second diverging beam and forms a second collimated beam 438, which is intercepted by focusing lens 430. Focusing lens 430 forms a beam 414 which may be focused onto a workpiece.

During processing, and as explained above, a plasma is generated, and an image of this plasma will be transmitted back through the lens apparatus within coupler 412 and through the optical fiber. The image signal will be substantially wideband but may contain some 1.06 micrometer signals due to reflection of beam 414 off the workpiece. The image signal is emitted from the optical fiber and reflected by mirror 404 to filter 418. Filter 418 is utilized to block any 1.06 micrometer signals so that only the actual signals due to the plasma image are focused by lens 420 onto photodetector 422. The signal from detector 422 therefore is representative of the plasma formed during processing and such a signal can be utilized to control operations. Although not shown in FIG. 7, a top and bottom side sensor, as well as a sensor within laser source 400 could also be utilized as explained with reference to the other embodiments described herein.

From the foregoing discussion, it should be apparent that the present invention provides continuous monitoring of laser materials processing and operates in substantially real time. Importantly, each embodiment of the present invention does not slow laser materials processing speed and operates substantially simultaneously with the processing operations. Further, the data generated by the present apparatus can also be utilized to provide an indication of other hole geometric properties including recast layer thickness and hole taper. For example, data could be gathered during a calibration operation performed on a test coupon, and from such data which provided desirable results, comparisons during processing could be performed. If a deviation from the desired signals is detected, then adjustments could be made to the processing components. The present monitoring system also can be utilized to indicate failure of other system components such as a break in an optical fiber or laser beam/laser flashlamp degradation as indicated by a sudden change in plasma intensity not due to breaking through a workpiece.

While the present invention has been described with respect to a specific embodiment, many modifications, variations, substitutions and equivalents will be apparent to workers in the art. Accordingly, it is intended that the invention be limited only by the spirit and scope of the appended claims.

What is claimed is:

1. An apparatus for monitoring laser materials processing of a workpiece, said apparatus comprising:
    means for optically monitoring the processing and generating a processing signal representative of the processing;
    means for interpreting said processing signals and generating an interpreted output; and
    means for controlling the materials processing based upon said interpreting means interpreted output and by generating a control signal applied to a laser materials processing component, said control means comprising means for determining breakthrough time.

2. An apparatus for monitoring laser materials processing in accordance with claim 1 wherein said optical monitoring means comprises:
    a first optical sensor disposed so as to view the workpiece on a same side that a laser beam is to be applied.

3. An apparatus for monitoring laser materials processing in accordance with claim 1 wherein said optical monitoring means comprises:
    a second optical sensor disposed so as to view the workpiece on an opposite side from a side that a laser beam is to be applied.

4. An apparatus for monitoring laser materials processing in accordance with claim 1 wherein said optical monitoring means comprises:
    a third optical sensor disposed so as to generate a signal representative of a length of a laser beam pulse emitted from a laser source, the laser beam pulse being utilized to perform the materials processing.

5. An apparatus for monitoring laser materials processing in accordance with claim 1 wherein said optical monitoring means comprises a photodiode.

6. An apparatus for monitoring laser materials processing in accordance with claim 1 wherein said interpreting means comprises means for spectrally analyzing data from said optical monitoring means.

7. An apparatus for monitoring laser materials processing in accordance with claim 1 wherein said control means further comprises:
    means for controlling the focusing of a materials processing laser beam onto a focal plane; and
    means for causing relative motion between the focal plane and the workpiece.

8. A laser materials processing apparatus for performing laser materials processing on a workpiece, said processing apparatus comprising:
    means for applying a laser beam to a workpiece;
    means for optically monitoring the processing and generating a processing signal representative of the processing;
    means for interpreting said processing signals and generating an interpreted output; and means for controlling the materials processing based upon said interpreting means interpreted output and by generating a control signal applied to a laser materials processing component, said control means comprising means for determining breakthrough time.

9. A laser materials processing apparatus in accordance with claim 8 wherein said laser beam applying means comprises;

a power source;

a laser beam source coupled to said power source;

an output coupler; and an optical fiber coupled between said power source and said output coupler for transmitting a laser beam emitted from said power source to said output coupler.

10. An apparatus for monitoring laser materials processing in accordance with claim 8 wherein said optical monitoring means comprises:

a first optical sensor disposed so as to view the workpiece on a same side that a laser beam is to be applied.

11. An apparatus for monitoring laser materials processing in accordance with claim 8 wherein said optical monitoring means comprises:

a second optical sensor disposed so as to view the workpiece on an opposite side from a side that a laser beam is to be applied.

12. An apparatus for monitoring laser materials processing in accordance with claim 8 wherein said optical monitoring means comprises:

a third optical sensor disposed so as to generate a signal representative of a length of a laser beam pulse emitted from a laser source, the laser beam pulse being utilized to perform the materials processing.

13. An apparatus for monitoring laser materials processing in accordance with claim 8 wherein said optical monitoring means comprises a photodiode.

14. An apparatus for monitoring laser materials processing in accordance with claim 8 wherein said interpreting means comprises means for analyzing data from said optical monitoring means.

15. An apparatus for monitoring laser materials processing in accordance with claim 8 wherein said control means further comprises means for focusing a materials processing laser beam onto a focal plane, and means for causing relative motion between the focal plane and the workpiece.

16. An apparatus for monitoring laser materials processing in accordance with claim 8 wherein said means for interpreting the processing signal and generating an interpreted output comprises a pulse length determination means including a pulse length comparator.

* * * * *